United States Patent [19]

Fujie et al.

[11] 4,321,679
[45] Mar. 23, 1982

[54] WORK SETTING SYSTEM FOR MANUFACTURING PROCESS

[75] Inventors: Masakatsu Fujie, Ushikumachi; Kengo Sugiyama, Abiko; Hiroshi Yamamoto, Shimoinayoshi; Takashi Yoshida, Minorimachi; Yutaka Endo, Ushikumachi, all of Japan

[73] Assignee: Hitachi, Ltd., Tokyo, Japan

[21] Appl. No.: 107,925

[22] Filed: Dec. 28, 1979

[30] Foreign Application Priority Data

| Jan. 8, 1979 [JP] | Japan | 54-229 |
| Nov. 2, 1979 [JP] | Japan | 54-141332 |
| Nov. 2, 1979 [JP] | Japan | 54-141333 |
| Nov. 2, 1979 [JP] | Japan | 54-141334 |

[51] Int. Cl.³ .................................................. G06F 15/46
[52] U.S. Cl. .................................... 364/474; 364/478; 364/513; 414/591
[58] Field of Search ............... 364/474, 478, 513, 491, 364/468; 414/589, 591, 749–754, 757, 775, 780, 781, 783, 453, 454, 5, 134–136; 198/345, 376, 394, 395; 29/430, 568, 563, 33 P

[56] References Cited

U.S. PATENT DOCUMENTS

| 3,576,540 | 4/1971 | Fair et al. ....................... 364/107 X |
| 3,618,742 | 11/1971 | Blanchard et al. ................. 198/395 |
| 3,804,270 | 4/1974 | Michaud et al. ................. 364/478 X |
| 3,967,242 | 6/1976 | Isoo et al. ...................... 364/513 X |
| 3,986,007 | 10/1976 | Ruoff, Jr. ............................ 364/513 |
| 4,146,924 | 3/1979 | Birk et al. ........................... 364/513 |
| 4,187,051 | 2/1980 | Kirsch et al. .................... 364/478 X |

*Primary Examiner*—Joseph F. Ruggiero
*Attorney, Agent, or Firm*—Craig and Antonelli

[57] ABSTRACT

A work setting system associated with a group of machine tools arranged in a production line for setting workpieces on pallets. The system includes a setting table section providing a location for setting a workpiece on a pallet, a work centering and clamping unit arranged around the setting table section for driving positioning jigs and clamping members to be attached on the pallet, a measuring unit measuring the dimensions of the workpiece on the pallet and supplying signals to the work centering and clamping unit which represents the measurements of the workpiece as positioning signals, a handling unit for handling the pallets, the workpieces and the jigs, and a control unit for controlling the work setting table section, the centering and clamping unit, the measuring unit and the handling unit in a conversational mode and also supplying and receiving information exchanged between control unit for the group of machine tools and a central processing unit superposing the control units.

6 Claims, 17 Drawing Figures

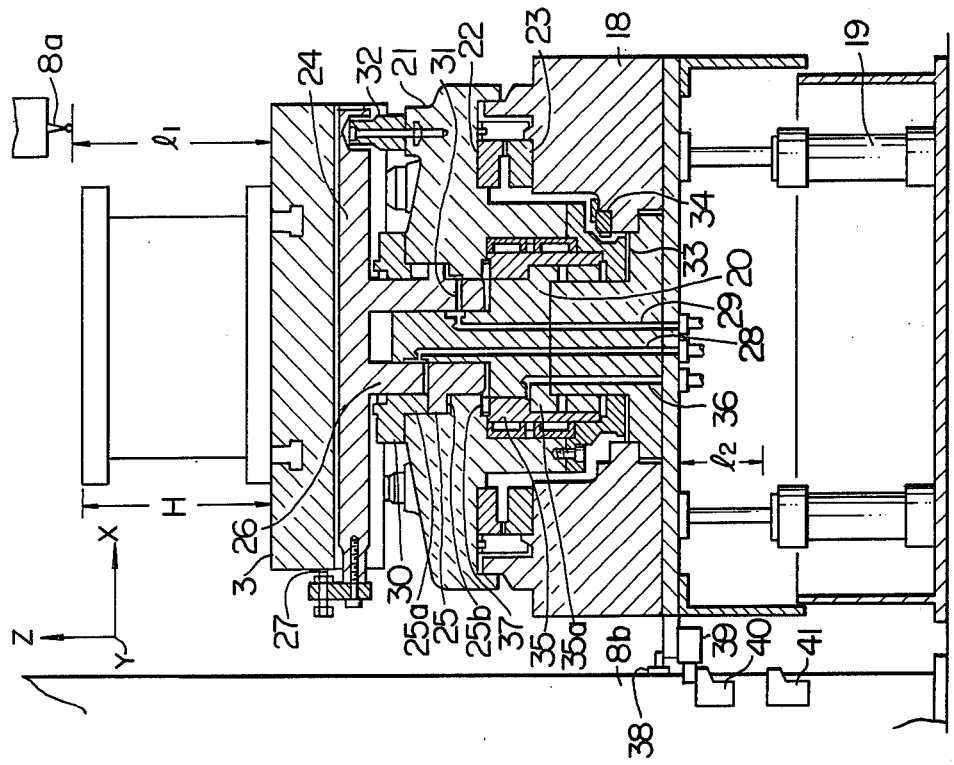

WORK SETTING SYSTEM FOR MANUFACTURING PROCESS

BACKGROUND OF THE INVENTION

1. Field of the Invention

This invention relates to a manufacturing system for controlling a multiplicity of machine tools forming a group and conveyor means for supplying to the group of machine tools a pallet having a workpiece supported thereon, and, more particularly, to a work setting system for the group of machine tools including work setting means connected to the conveyor means.

2. Description of the Prior Art

With the advent of automation in the operation of machine tools, there has in recent years been a tendency toward strengthening the control of the rate of operation of machine tools and the circulation of workpieces to be machined. One example of this system of automation is a system wherein a plurality of machine tools are arranged in a line and the machine tools and conveyor means are controlled in a centralized control process. In the centralized control process, the supply of workpieces to conveyor means is effected by setting a workpiece on a pallet which can be mounted on a machine tool and by feeding the pallet with the workpiece set thereon to the conveyor means. When the workpiece is set on the pallet, it is necessary to perform various operations with a high degree of precision for effecting three-dimensional positioning of the workpiece or effecting horizontal positioning, paralleling and centering of the workpiece to the pallet. It has hitherto been customary to carry out a work setting operation manually. Such work setting operation is described, for example, in the Oct. 23, 1967 issue of the periodical "AMERICAN MACHINIST". The work setting system for a manufacturing process of the prior art which has required manual operation of setting works has had disadvantages in that when the workpiece is heavy in weight, the work setting operation required to be practiced with a high degree of precision as aforesaid markedly lowers the rate of operation of machine tools and the operators are forced to engage in hard labor.

SUMMARY OF THE INVENTION

An object of this invention is to provide a workpiece setting system for setting a work on a pallet associated with a line of a group of machine tools.

Another object is to provide a work setting system capable of reducing manual labor in performing a work setting operation.

Still another object is to provide a work setting system capable of achieving standardization of the work setting technology and increasing the efficiency with which work setting is carried out.

A further object is to provide a work setting system capable of remarkably increasing the productivity of a line of machine tools.

According to the invention, there is provided, for accomplishing the aforementioned objects, a work setting system for setting workpieces on pallets which can be mounted on every machine tool of a line, comprising a setting table section providing a location for setting a workpiece on a pallet, a drive unit placed around the setting table section for driving positioning jigs and clamping members to be attached on the pallet, a measuring unit for measuring the dimensions of the workpiece on the pallet and supplying to the drive unit signals representing the measurements of the workpiece as positioning signals, a handling unit for handling the pallets, the workpieces and the jigs, and a control unit for controlling the work setting table section, the drive unit, the measuring unit and the handling unit in a conversational mode between a machine and an operator and also supplying and receiving information exchanged between a control unit for the group of machine tools and a central processing unit superposing the control units.

Additional and other objects, features and advantages of the invention will become apparent from the description set forth hereinafter when considered in conjunction with the accompanying drawings.

BRIEF DESCRIPTION OF THE DRAWINGS

FIG. 4 is a plan view of the work setting table and the measuring unit shown in FIG. 3;

FIG. 5 is a vertical sectional front view of the work setting table section, showing its construction in detail;

DESCRIPTION OF THE PREFERRED EMBODIMENT

Figure 1:
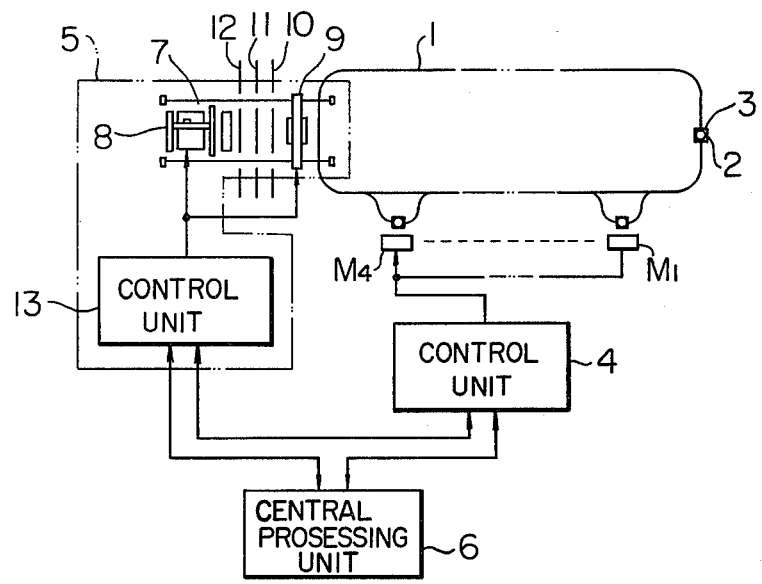
FIG. 1 is a diagrammatic plan view illustrating an arrangement of a group of machine tools provided with the work setting system according to the invention.

FIG. 1 shows the arrangement of a group of machine tools provided with the work setting system according to the invention. As shown, the machine tools M1 to M4 are controlled by a numerical control system, and a conveyor means 1 supplies a workpiece 2 to the machine tools M1 to M4 and comprises a conveyor chain, for example. The workpiece 2 is fixed on a pallet 3 and placed on the conveyor means 1. The machine tools M1 to M4 are controlled by the control unit 4 for the group of machine tools M1 to M4 which stores information on the working steps to be followed by the machine tool group and information on the management of tools. The control unit 4 has the function of enabling an operation to be performed in a so-called conversational mode in which the operator is in direct communication with the machine tools and is able to exchange information therewith while the operator and the machine tools M1 to M4 perform functions that suit them best. The control unit 4 is connected to a central processing unit 6 superposing thereon and effecting overall control of the machine tools M1 to M4 and a work setting station 5.

In the work setting station 5, a series of operations that includes fixing the workpiece 2 on the pallet 3 with a high degree of precision and transferring same to the conveyor means 1, and an operation of re-fixing the workpiece 2 to perform a machining operation on the work 2 for the second time are performed. Located in the work setting station 5 are a work setting table section 7, clamping members and the like which are mounted on the pallet 3, a drive unit, not shown, for driving positioning jigs, a measuring unit 8 and a handling unit 9. Also, in order to increase the efficiency with which the work setting operation is performed, the aforesaid conveyor means 1, exclusively used jig conveyor means 10 and work conveyor means 11 are arranged in the station 5. The work setting station 5 is controlled by a control unit 13 which, like the control unit 4 for the machine tools $M_1$ to $M_4$, has the function of performing operations in a conversational mode, and which stores information on the process in which work setting is carried out. The control unit 13 is connected to the control unit 4 and the central processing unit 6 to enable exchange of information therewith to take place.

The detailed construction of the essential portions of the work setting station 5 will be described by referring to FIG. 2 wherein parts similar to those shown in FIG. 1 are designated by like reference characters. The conveyor means 1 conveys to the machine tools $M_1$ to $M_4$ the pallet 3 on which the workpiece 2 is set. The exclusively used jig conveyor means 10 delivers an exclusively used jig 14 which is necessary when the workpiece 2 is set on the pallet 3. The workpiece conveyor means 11 delivers the work 2 to be machined. The pallet conveyor means 12 delivers the pallet 3. These conveyor means are arranged in side-by-side relation. Disposed near the pallet conveyor means 12 is a section for storing interchangeable hands 15 for a handling unit 9 subsequently to be described and interchangeable universal jigs 16.

Located around the setting table section 7 are drive devices 17a–17d for driving positioning jigs and clamp members to be mounted on the pallet 3. Of these drive devices 17a–17d, the drive device 17a located in an X-direction of entry and exit of the workpiece 2 or pallet 3 is able to move in a Y-direction that is at right angles to the X-direction so as not to interfere with the operation of supplying and discharging same. The drive device 17a is provided with a temporary pallet storing section 17e for temporarily storing the pallet 3 therein.

Figure 3:
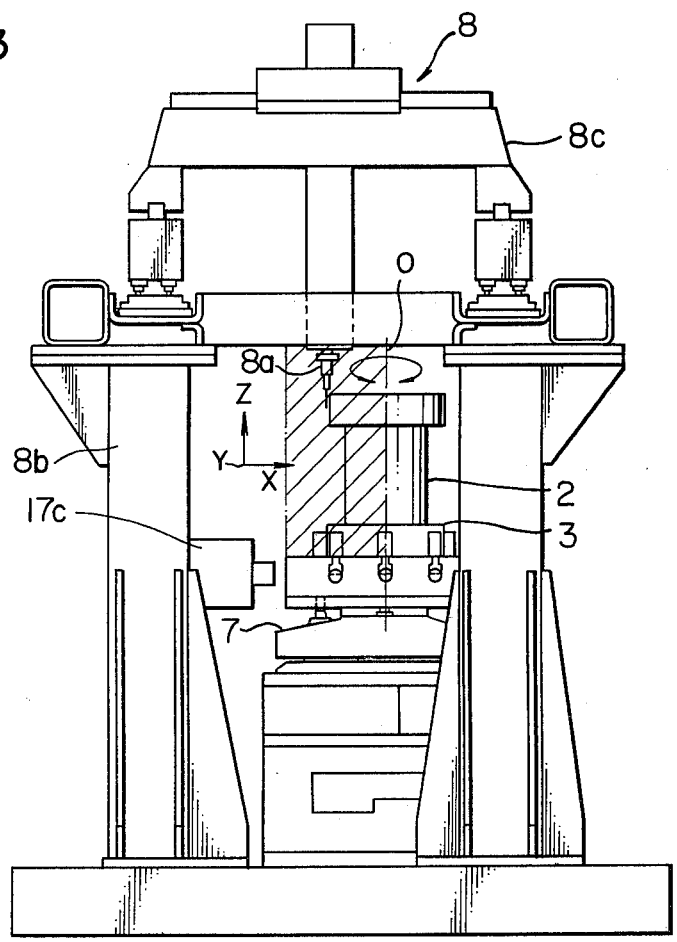
FIG. 3 is a front view of the work setting table and the measuring unit.
Figure 7:
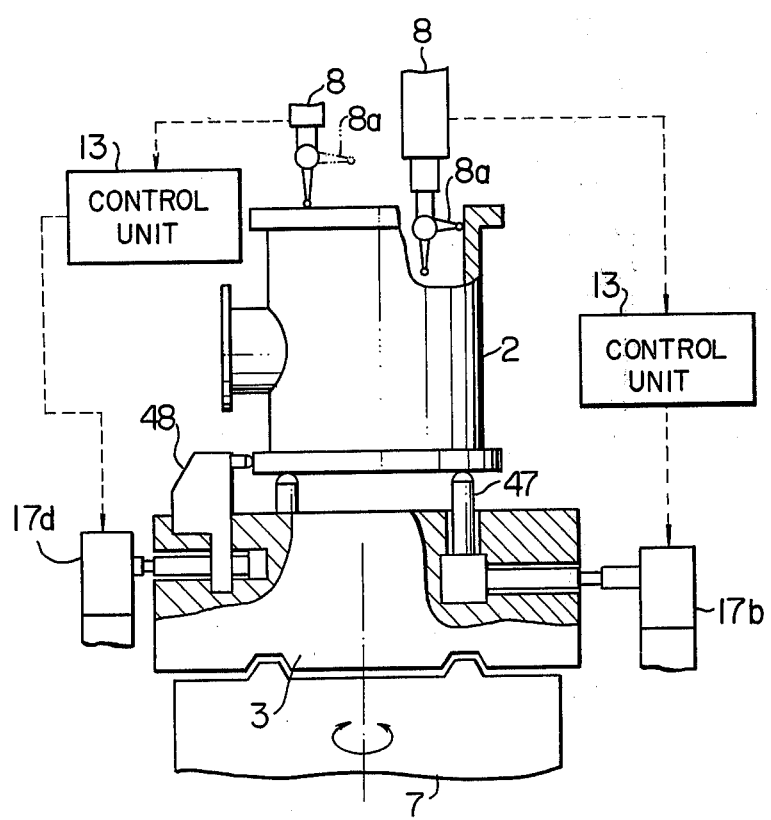
FIG. 7 is a partially schematic view showing the manner in which a work on a pallet is measured.

The measuring unit 8 forms a servo loop control circuit with the drive devices 17a–17d and includes a measuring section 8a moved in a three-dimensional x-y-z coordinate space by a moving device 8c mounted on a support frame 8b to measure the workpiece 2 in the three-dimensional directions or in the X-direction, Y-direction and Z-direction and supply signals representing the measurements to the drive devices 17a–17d through the control unit 13 as positioning control signals for effecting horizontal positioning, paralleling and centering of the workpiece 2. Upon receipt of the positioning control signals, the drive devices 17a–17d drive the jigs mounted on the pallet 3 to control horizontal positioning, paralleling and centering of the workpiece 2. Following completion of positioning of the workpiece 2, the drive devices 17a–17d drive the clamp members to secure the workpiece 2 to the pallet 3. The drive devices 17a–17d each includes plurality of drive sections capable of moving in an X-Y plane relative to a pallet for a workpiece of square shape or a pallet for a work of round shape. Also, the drive devices 17a–17d can be used exclusively for a pallet for a workpiece of square shape or a pallet for a workpiece of round shape. When this is the case, it is necessary to provide two work setting stations 5 each for handling one of the square-shaped workpieces and round-shaped workpieces. The measuring section 8a of the measuring unit 8 measures a hatched region shown in FIG. 3 in an X-Z plane and a hatched region shown in FIG. 4 in an X-Y plane, or measures a region which is ¼ the space over the pallet 3. Meanwhile the pallet 3 is moved counterclockwise about its center of rotation 0 by the setting table section 7 as shown in FIG. 7 so that the pallet 3 moves through 90° each time it is moved (the mechanism responsible for the rotary movement is subsequently to be described). Thus, the measuring section 8a is able to measure the entire region over the pallet 3. In order that measuring of the workpiece 2 by the measuring unit 8 may be effected with a high degree of precision, it is necessary that the measuring unit 8, particularly the measuring section 8a thereof, be positioned with a high degree of precision relative to the pallet 3. To this end, the rigidity of the support frame 8b and moving device 8c of the measuring unit 8 should be increased. However, since the region measured by the measuring section 8a of the measuring unit 8 is confined, as described hereinabove, to only ¼ the total zone of space over the pallet 3, the rigidity of the support frame 8b and moving device 8c of the measuring unit 8 may be lower than would be the case if the entire zone over the pallet 3 were measured by the measuring section 8a. Since the region measured by the measuring section 8a is small, there is the advantage that errors can be minimized in carrying out measuring operations.

The setting table section 7 will be described in detail by referring to FIG. 5 wherein parts similar to those shown in FIGS. 1–4 are designated by like reference characters. The setting table section 7 comprises a main body 18 supported for vertical movements by a hydraulic cylinder 19. The main body 18 has a fixed shaft 20 located in its central portion. A rotary member 21 is supported on the main body 18 through couplings 22 and 23 and it is rotated about the fixed shaft 20. A pallet guide 24 has the pallet 3 placed thereon after being moved rightwardly in the plane of FIG. 5 or in the X-direction. The pallet guide 24 has on its undersurface a cylindrical member 26 having a piston 25 and has on its left side a stopper 27 for the pallet 3. Fluid under pressure is supplied to and discharged from an upper fluid chamber 25a and lower fluid chamber 25b of the piston 25 through fluid passages 28 and 29 formed in the fixed shaft 20 and fluid passages 30 and 31 formed in the cylindrical member 26. With the fluid under pressure being supplied to the upper fluid chamber 25a, the pallet guide 24 moves downwardly along the cylindrical member 26 to permit the pallet 3 to be secured in place on the rotary member 21. Upon the fluid under pressure being supplied to the lower fluid chamber 25b of the piston 25, the pallet 3 is released from locking engagement with the rotary member 21 and a positioning device 32 for the pallet guide 24 and rotary member 21 is disengaged.

Engaging and disengaging of the couplings 22 and 23 and engaging of a gear 33 in the rotary member 21 and a rack 34 are effected by a piston 35 interposed between the rotary member 21 and fixed shaft 20. More specifically, as the fluid under pressure is supplied to a lower fluid chamber 35a of the piston 35 through a fluid passage 36, the piston 35 moves upwardly by pressing a resilient member 37 on its upper portion, to enable the rotary member 21 to move upwardly relative to the main body 18 and fixed shaft 20. The upward movement of the rotary member 21 disengages the couplings 22 and 23 and engages the gear 33 and rack 34. As the supply of the fluid under pressure to the lower fluid chamber 35a is interrupted, the couplings 22 and 23 are engaged and the gear 33 and rack 34 are disengaged. The couplings 22 and 23 are each provided with teeth on a surface juxtaposed against the corresponding toothed surface of the other coupling. Indexing and horizontal positioning are effected by the meshing engagement of the teeth of the couplings 22 and 23. The rack 34 is moved by a hydraulic cylinder, not shown, in a direction perpendicular to the plane of the figure or in the Y-direction.

The hydraulic cylinder 19 moves the setting table section 7 vertically upon recept of information concerning the height of the workpieces 2 from the control unit 13. The hydraulic cylinder 19 is associated with the measuring operation performed by the measuring unit 8 and performs the following function. The limitations placed on the workpieces 2 handled by the work setting system are determined by the measuring region of the measuring unit 8. On account of this reason, it is necessary to increase the size of the measuring unit 8 when the workpieces 2 is large in size. If the range of movement of the measuring section 8a of the measuring unit 8 in the Z-direction is increased, the precision with which measuring is carried out is reduced. By designating the stroke of the hydraulic cylinder 19 by $l_2$ and by designating the maximum distance that is measurable, when the table 3 is raised by the cylinder 19 for a distance $l_2$, between the upper surface of the pallet 3 that is measurable and the measuring section 8a by $l_1$, the range of the height H of the workpiece 2 that can be handled can be expressed by the following equation (1):

$$H \leq l_1 + l_2 \quad (1)$$

When the height H of the workpiece 2 is within the range of the following equation (2), $$l_2 \leq H \leq l_1 + l_2 \quad (2)$$

the hydraulic cylinder 19 is contracted to move the setting table section 7 downwardly. If the height of the workpiece 2 is $H < l_2$ when the hydraulic cylinder 19 is in its contracted state, the measuring section 8a will be out of the range of the workpiece 2, so that the hydraulic cylinder 19 is expanded to move the setting table section 7 upwardly. By this arrangement, the precision with which measuring is carried out in a measuring operation can be increased. The end of the setting table section 7 moved upwardly by the hydraulic cylinder 19 is detected by a detector 38 located on the support frame 8b. Upon detecting the end of the setting table 7, the detector 38 produces a signal for stopping the upward movement of the setting table section 7 and supplies same to the control unit 13. Upon receipt of this signal, the control unit 13 transmits a stop signal to the hydraulic cylinder 19 and produces a signal which actuates a stopper 39 provided to the setting table section 7. The stopper 39 is brought into engagement with a dog 40 on the support frame 8b of the measuring unit 8. By this arrangement, the precision of positioning of the setting table section 7 following the finishing of its upward movement is ensured. A dog 41 located below the dog 40 is used for stopping the setting table section 7 in its downward movement.

Figure 6:
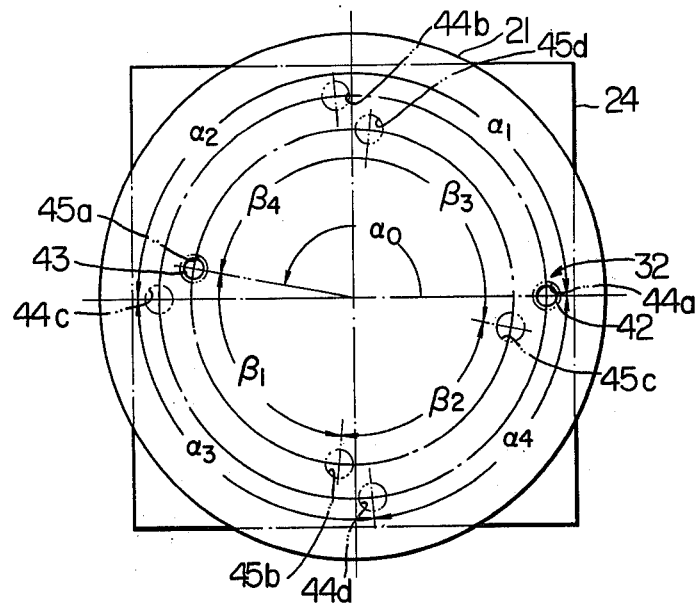
FIG. 6 is a diagrammatic plan view illustrating the arrangement of the positioning devices of the work setting table section.

One example of the positioning device 32 for the pallet guide 24 and the rotary member 21 is shown in FIG. 6. As shown, the positioning device 32 comprises two positioning pins 42 and 43 on the upper surface of the rotary member 21, and positioning holes 44a–44d and 45a–45d formed on the undersurface of the pallet guide 24. The positioning pin 43 is located at an angle $\alpha_0$ (170°, for example) in the counterclockwise direction from the positioning pin 42. The positioning holes 44a–44d receive the positioning pin 42 therein while the positioning holes 45a–45d receive the positioning pin 43 therein. The angles $\alpha_1$ to $\alpha_4$ between the positioning holes 44a–44d are set at 95°, 85°, 95° and 85°, for example. This means that the angles $\alpha_1$ to $\alpha_4$ may vary from one another with respect to 90°. Likewise, the angles $\beta_1$ to $\beta_4$ between the positioning holes 45a–45d are set at 95°, 85°, 95° and 85°. By this arrangement, when the positioning pins 42 and 43 are released from engagement in the positioning holes 44a and 44a and 45a, respectively, as shown in FIG. 6 and the positioning pin 42 is rotated counterclockwise through the angle $\alpha_1$ by the rotary member 21 as the latter rotates, the positioning pin 42 is engaged in the positioning hole 44b and the positioning pin 43 is engaged in the positioning hole 45b. By the rotation of the rotary member 21, indexing of the pallet 3 mounted on the pallet guide 24 can be effected. However, the reappearance of the precision with which indexing is effected in each indexing position depends on the degree of precision with which the angles $\alpha_1$ to $\alpha_4$ and $\beta_1$ to $\beta_4$ of the positioning holes 44a–44d and 45a–45d are formed respectively. Thus, by measuring beforehand the angles of the positioning holes 44a–44d and 45a–45d for the respective indexing positions which would be obtained after machining is performed and by correcting the measured values for the respective indexing positions when the workpiece 2 is measured, it is possible to measure the workpiece 2 with high precision.

Figure 2:
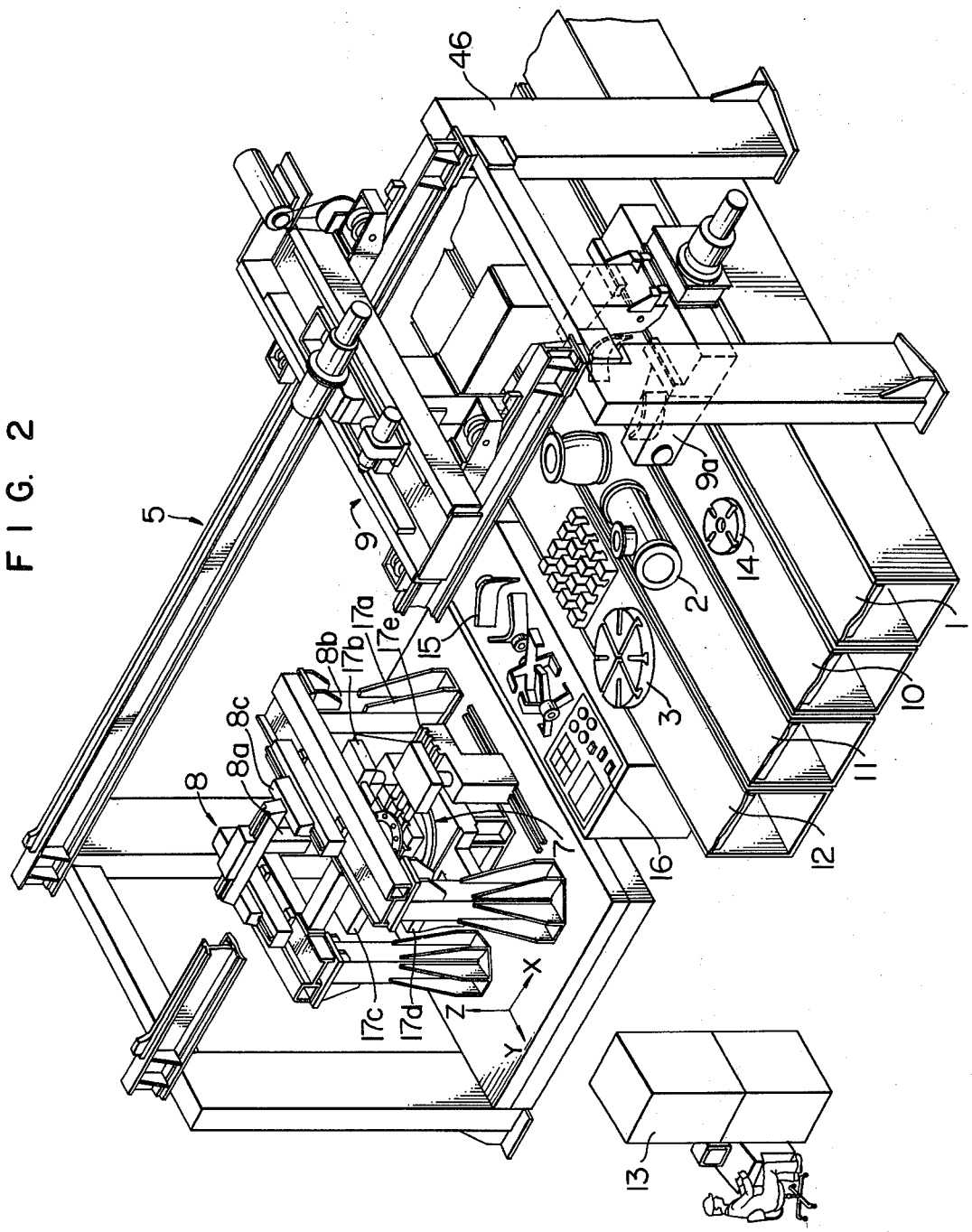
FIG. 2 is a perspective view of the work setting station of the work setting system according to the invention.

The handling unit 9 is mounted, as shown in FIG. 2, on a support frame 46 straddling the conveyor means 1, 10–12, the storing section for the interchangeable hands 15 and the interchangeable universal jigs 16, the setting table section 7 and the measuring unit 8. In order that the handling unit 9 may handle a small number of workpieces 2 of a large variety of kinds and pallets 3, its hands 9a are reversible and at the same time interchangeable. The hands 9a of the handling unit 9 are able to move in three directions or in the X-direction and Y-direction horizontally and in the Z-direction vertically, and the movement of the hands 9a is controlled in accordance with the information transmitted from the central processing unit 6 and based on the judgment of information passed by the operator of the control unit 13.

FIG. 7 shows one example of an operation of positioning the workpiece 2 on the setting table section 7. In the figure, parts similar to those shown in FIGS. 1–6 are designated by like reference characters. The pallet 3, placed on the setting table section 7, is provided with horizontal positioning plungers 47, each moved vertically as by a screw and centering plungers 48 each moved horizontally as by a screw. The plungers 47 and 48 are actuated by the drive devices 17a–17d. In FIG. 7, the drive devices 17b–17d are shown. The drive devices 17a–17d are controlled based on the signals representing the measurements of the workpiece 2 obtained by the measuring section 8a of the measuring unit 8.

Figure 8:
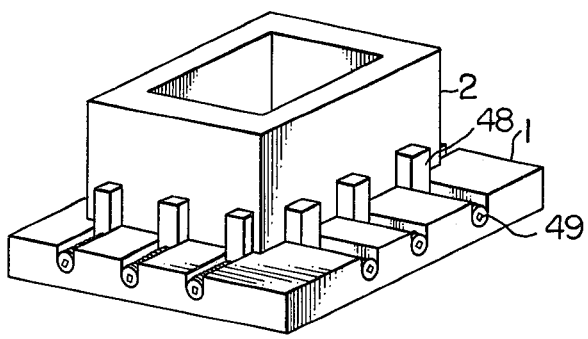
FIG. 8 is a perspective view of a workpiece of square shape and a pallet having the workpiece mounted thereon.
Figure 9:
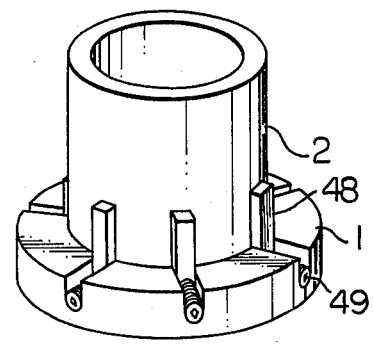
FIG. 9 is a perspective view of a workpiece of round shape and a pallet having the workpiece mounted thereon.
Figure 10:
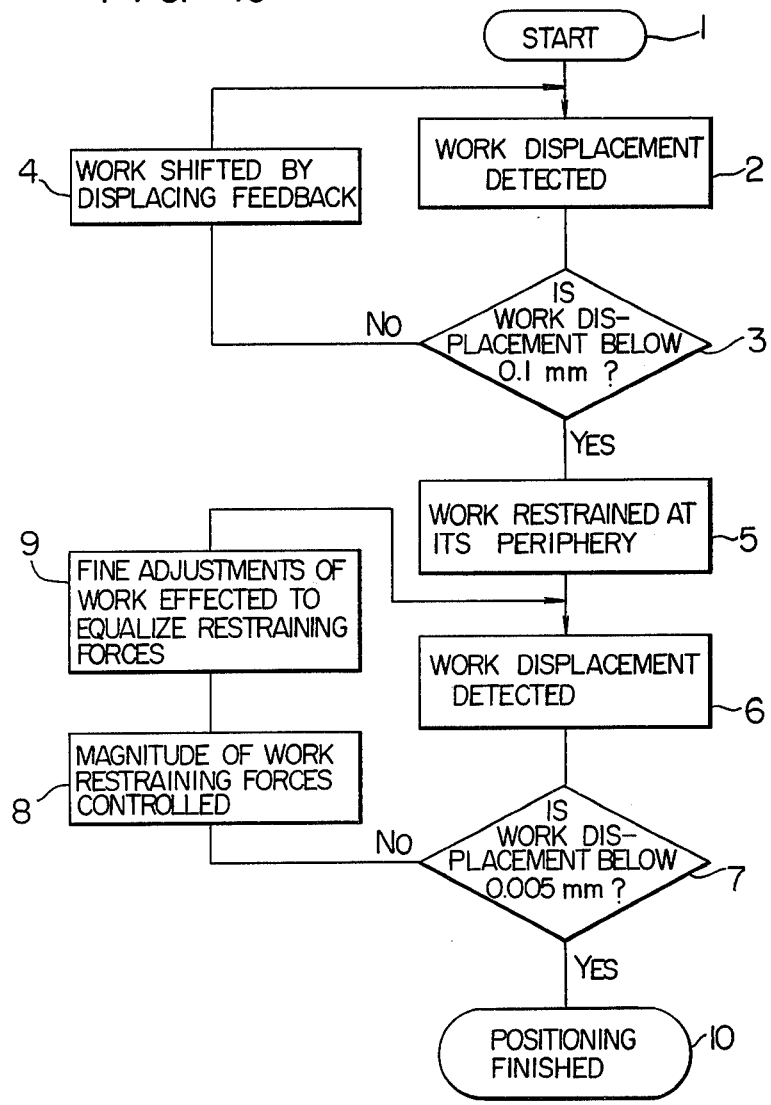
FIG. 10 is a flow chart in explanation of the operation of positioning a workpiece.
Figure 11A:
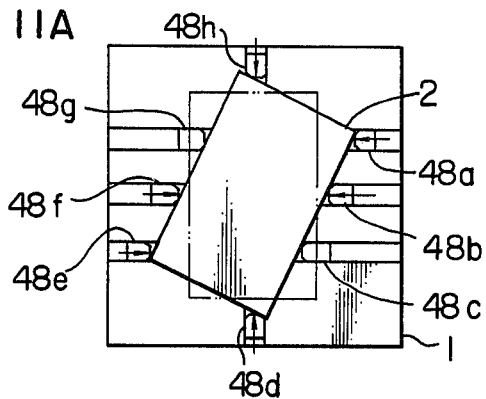
FIGS. 11(A)–11(C) are plan views in explanation of the operation of positioning a workpiece of square shape.
Figure 11B:
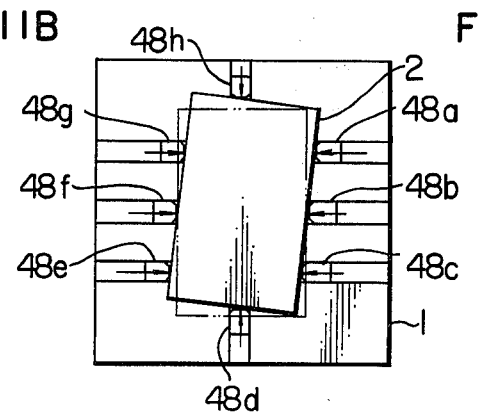
Figure 11C:
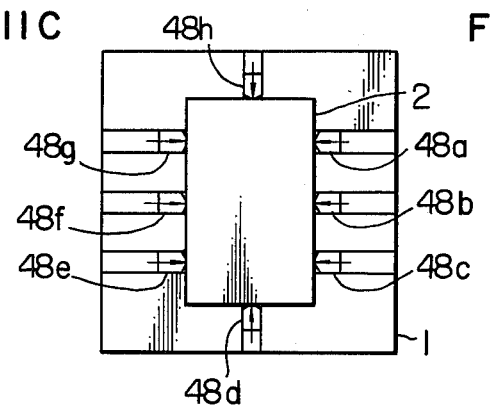

A process of centering the workpiece 2 on the pallet 3 with high precision by means of the centering plungers 48 will first be described. The workpiece 2 may be square or round in shape. Thus there are a pallets for a workpiece of square shape shown in FIG. 8 and a pallet for a workpiece of a round shape shown in FIG. 9. The pallet 3 for a square workpiece is provided with a plurality of centering plungers 48 moved by feed screws 49 which move in directions right-angled to each other as shown in FIG. 8. Likewise, the pallet 3 for a round workpiece is also provided with the centering plungers 48 moved by the feed screws moving radially. The operation of positioning the workpiece 2 of the square shape on the pallet 3 for the square workpiece by centering will now be described by referring to a flow chart shown in FIG. 10 and an explanation of centering shown in FIG. 11. When the workpiece 2 on the pallet 3 is displaced from its reference position shown by dash-and-two dots lines in FIG. 11(A), a positioning operation is started [step (1) in FIG. 10], and the amount of inclination of the workpiece 2 with respect to the positions of the centering plungers 48a and 48b, for example, is measured by the measuring unit 8 [step (2) in FIG. 10]. Judgment is passed as to whether the work displacement is below a predetermined value (0.1 mm in this example). When the work displacement is below the predetermined value [step (3) in FIG. 10], the centering plungers 48a, 48b, 48d, 48e, 48f and 48h are controlled as to their displacements as shown in FIG. 11(A), to move the workpiece 2 in an amount corresponding to the work displacement [step (4) in FIG. 10]. Following completion of the workpiece movement, the displacement of the work 2 with respect to its reference position is detected again [step (2) in FIG. 10]. This operation is repeated until the work displacement is reduced below the predetermined value [step (3) in FIG. 10]. When the work displacement is reduced below the predetermined value, the workpiece 2 is restrained at its periphery by the centering plungers 48a–48h as shown in FIG. 11(B) [step (5) in FIG. 10]. With the workpiece 2 being restrained as aforesaid, the displacement of the workpiece 2 with respect to its reference position is detected [step (6) in FIG. 10]. Judgment is passed as to whether the work displacement is below another predetermined value (0.005 mm in this example). When the work displacement is above this value, the restraining forces exerted on the workpiece 2 by the centering plungers 48a and 48e directed in the direction in which the workpiece 2 should be moved are increased and the restraining forces excerted on the workpiece 2 by the centering plungers 48c and 48g directed in the direction against which the workpiece 2 should be moved are reduced as shown in FIG. 11(B) [step (8) in FIG. 10]. By exerting restraining forces on the workpiece 2 which vary depending on the distances for which the workpiece 2 should be moved thereby effect control of the forces exerted on the workpiece 2, fine movements according to the stress of the workpiece 2 are effected for an amount corresponding to the amount in which the workpiece 2 deviates from its reference position, to equalize the restraining forces exerted on the workpiece 2 [step (9) in FIG. 10]. After fine movements of the workpiece 2 are finished or after the restraining forces are equalized, the displacement of the workpiece with respect to the reference position of the workpiece 2 is detected again [step (6) in FIG. 10]. This operation is repeated until the work displacement is reduced below the predetermined value (0.005 mm) [step (7) in FIG. 10]. When the displacement is below this value, the workpiece 2 is positioned as shown in FIG. 11(C) in its reference position as the result of the centering operation [step (10) in FIG. 10].

Figure 12A:
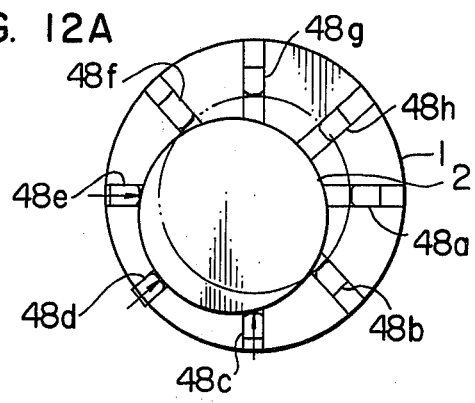
FIGS. 12(A)–12(C) are plan views in explanation of the operation of positioning a workpiece of round shape.
Figure 12B:
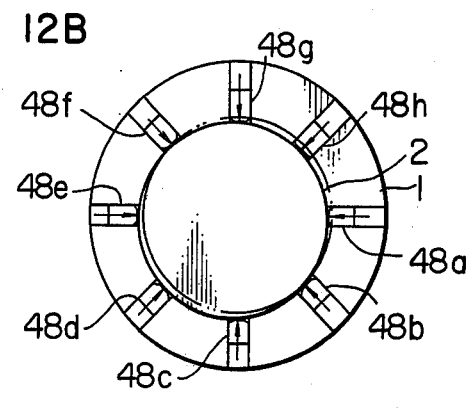
Figure 12C:
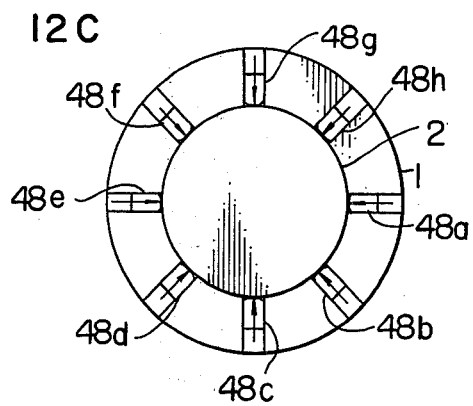

Besides the process described hereinabove, there are other processes available for differentiating the restraining forces exerted by the centering plungers 48e–48g. For example, one process consists in reducing all the restraining forces and then increasing the restraining forces exerted on the work 2 in the direction in which the workpiece 2 is moved, another process consists in increasing all the restraining forces and then reducing the restraining forces exerted on the workpiece 2 in the direction in which the work 2 is moved and a further process consists in exerting varying restraining forces on the workpiece 2 at a time. FIGS. 12A, 12B, 12C show the manner in which positioning of the workpiece 2 of a round shape is effected. In this case, positioning can be carried out according to the flow chart shown in FIG. 10.

Figure 13:
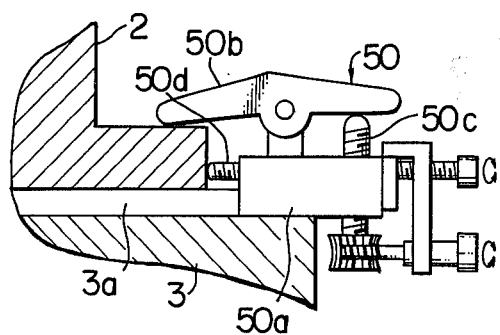
FIG. 13 shows one example of the clamping device for the workpiece.

FIG. 13 shows in detail one example of the clamping mechanism for the workpiece 2 on the pallet 3. As shown, a clamping jig 50 is received in a chuck groove 3a formed in the pallet 3 and includes a main body 50a and a clamp claw 50b for clamping the workpiece 2 from above. The clamp claw 50b can be pivotally moved by means of a threaded member 50c. The main body 50a has a clamp rod 50d for clamping the workpiece 2 at its side by means of a threaded member. The clamp rod 50d and clamp claw 50b may be suitably used depending on the type of the workpiece 2 and controlled by the drive devices 17a–17d, not shown in FIG. 13. The clamp mechanism of the aforesaid construction is capable of controlling the clamping forces exerted by the clamp claw 50b and clamp rod 50d. These clamping forces are confirmed by detecting the clamping torques of the clamp claw 50b and clamp rod 50d. In addition to the positioning of the workpiece 2 effected by the positioning mechanism as described hereinabove, the clamp mechanism effects precise positioning of the workpiece 2 by means of the clamp claw 50b and clamp rod 50d based on the signals from the measuring unit 8, when the workpiece 2 is clamped.

The operation of the embodiment of the invention described hereinabove will now be described. First of all, the control unit 13 for the work setting station 5 receives information on work setting from the central processing unit 6 and decides upon detailed procedures of work setting based on the information. The control unit 13 is able to make a decision at high speed and with high efficiency based on the standardized work setting procedures stored in its memory and the judgment of the information made by the operator.

After detailed work setting procedures are decided upon in the control unit 13, setting of the workpiece 2 is carried out in accordance with the decided work setting procedures. First, the handling unit 9 grips the desired pallet 3 on the pallet conveyor means 12 and places same on the setting table section 7. Then, the handling unit 9 mounts the exclusively used jig 14 or universal jig 16 on the pallet 3, and place the workpiece 2 on the pallet 3 after the posture of the workpiece 2 is corrected.

After the jig 14 or 16 and the workpiece 2 are placed on the pallet 3, positioning of the workpiece 2 is carried out. The work positioning operation should be performed in such a manner that the horizontal positioning, paralleling and centering of the workpiece 2 are effected with a high degree of precision. In this example, horizontal positioning and centering of the workpiece 2 will be described. Horizontal positioning of the workpiece 2 is carried out in such a manner that the measuring section 8a of the measuring unit 8 is brought into contact with the upper surface of the workpiece 2 each time the work 2 is rotated through 90° by the workpiece setting table section 7 to obtain a horizontal measurement of the upper surface of the workpiece 2, and the horizontal measurement obtained in this way is transmitted to the control unit 13 which compares it with a horizontal value of the upper surface of the workpiece 2 stored in the control unit 13 beforehand and calculates the amount of deviation of the former from the latter. The amount of deviation from the horizontal amount stored in the control unit 13 is transmitted to the drive devices 17a–17d which actuate the horizontal positioning plungers 47 to control the levelling of the upper surface of the workpiece 2 with the horizontal. Centering of the workpiece 2 is carried out by rotating the workpiece 2 in the same manner as decribed with reference to horizontal positioning and detecting the amount of off-centering of the workpiece 2 by means of the measuring section 8a, before the centering plungers 48 are actuated by the drive devices 17a–17d. By these positioning operations, the workpiece 2 is positioned on the pallet 3 with a high degree of precision.

Upon completion of positioning of the workpiece 2, the workpiece 2 is secured to the pallet 3 by means of the clamping mechanism of the clamping jig 50 shown in FIG. 13. The clamping mechanism is actuated by the clamp claw 50b or clamp rod 50d which is operated by the drive devices 17a–17d. During the time the clamping operation is being performed, the clamping mechanism secures the workpiece 2 to the pallet 3 by controlling the clamping force and effects control of the positioning of the workpiece 2 by confirming again the displacement of the workpiece 2 by means of the measuring unit 8.

After the workpiece 2 is firmly secured to the pallet 3, the control unit 13 stores therein the information on the precision with which the workpiece 2 is positioned on the pallet 3 as measured by the measuring unit 8. Thereafter, the handling unit 9 grips the pallet 3 having the workpiece 2 firmly secured thereto and places same on the conveyor means 1 connected to the machine tools $M_1$ to $M_4$, so that the workpiece 2 on the pallet 3 is conveyed to the machine tools $M_1$ to $M_4$ by the conveyor means 1. Meanwhile the control unit 13 transmits to the control unit 4 for the machine tools $M_1$ to $M_4$ the information stored in its memory on the precision with which the workpiece has been positioned or the information on work setting. Based on the information transmitted thereto, the control unit 4 effects correction of the conditions under which machining of the workpiece 2 is carried out.

By following the aforesaid procedures, one process of setting the workpiece 2 is finished. In this process, various kinds of control, such as control of the measuring unit 8, control of the operation of the handling unit 9, control of the changing of the hands of the handling 9, control of the selection of the jigs 14 and 16, control of the clamping and positioning mechanism for the workpiece 2 and control of the rotation of the setting table section 7, as well as the exchange of information with the control unit 4 for the machine tools $M_1$ to $M_4$ and the central processing unit 6, are carried out by the control unit 13. In this way, control of all the units in the work setting station 5 can be effected in a coordinated fashion.

In the foregoing description, the work setting process has been described as being performed in a flow of the standardized pattern. However, it is to be understood that the hands of the handling unit 9 can be changed to conform to the shape and configuration of the workpiece 2 and the pallet 3, and that the work setting station 5 is also capable of performing the operations of releasing the workpiece 2 from the pallet 3 after being machined by the machine tools $M_1$ to $M_4$ and delivering the work to another processing station, reversing the workpiece 2 to have it machined again, and setting the workpiece 2 on the pallet 3 again. In the work setting station 5, it is also possible to practice what is referred to as a post-processing measuring operation in which the dimensions of the workpiece 2 on the pallet 3 that has been machind by the machine tools $M_1$ to $M_4$ are measured by the measuring unit 8 and the values obtained are transmitted to the control unit 4 for the machine tools $M_1$ to $M_4$ through the control unit 13 as the information on the amendments to be incorporated in the machining program. When the workpiece 2 to be handled by the handling unit 9 in the work setting station 5 is of a special type, judgment of the operator may be inputted to the control unit 13 to enable setting of the workpiece 2 of the special type to be effected successfully. When the jigs are selected by the handling unit 9, selection can be made in accordance with the positional information stored in the control unit 13 as the result of a learning.

From the foregoing description, it will be appreciated that the work setting system according to the invention enables a desired work to be set without requiring manual attention on a pallet that can be mounted on machine tools, thereby permitting labor saving to be effected. Also, the work setting system permits a work setting operation to be performed in a conversational mode relative to a production line so that the operator can obtain immediate response to his input messages to the control unit. Thus, the work setting art can be standardized and a work setting operation can be performed with increased efficiency as compared with the operation hitherto performed manually. The work setting system according to the invention offers the advantage that by virtue of its association with a production line through control means it is able to increase the efficiency of the production line.

What is claimed is:

1. A work setting system for setting workpieces with a high degree of precision on pallets that can be mounted on machine tools of a line of machine tools, the system comprising:

a setting table means for providing a location for setting a workpiece on a pallet, the setting table means being disposed near a conveyor means for transferring pallets to said machine tools;

work centering and clamping means placed around said setting table means for driving positioning jigs and clamping members to be attached on the pallet;

a measuring means provided on said setting table means for measuring dimensions of the workpiece on the pallet in three dimensions by contacting the workpiece and for supplying signals representing the measurements of the workpiece as positioning signals to said work centering and clamping means;

a handling means for handling the pallets, the workpieces and the jigs; and a control means for controlling said work setting table means, said work centering and clamping means, said measuring means and said handling means in a conversational mode between a machine and an operator and also for supplying and receiving information exchanged between a control means for the line of machine tools and a central processing means superposing both of said control means, said control means for controlling said work setting table means being capable of obtaining an amount of difference between the position of the workpiece determined by the information from said measuring means and a predetermined standard position of the workpiece, and supplying control signals to said work centering and clamping means for centering and positioning the workpiece.

2. A work setting system as claimed in claim 1 wherein said measuring means measures the dimensions of the workpiece after being machined or performs what is referred to as a post-processing measuring operation, and the information obtained in said post-processing measuring operation is inputted to the control means for the line of machine tools as information on the machining effected by the machine tools.

3. A work setting system as claimed in claim 1, wherein said handling means includes hands constructed so as to be able to be moved in three dimensions.

4. A work setting system as claimed in claim 1 or 3 wherein the hands of said handling means are interchangeable.

5. A work setting system as claimed in claims 1, wherein said control means for controlling said work setting table means includes a memory means for storing positional information on the jigs as the result of a learning of the operation of said handling means.

6. A work setting system as claimed in claim 1, wherein said control means for controlling said work setting table means supplies a signal to said work centering and clamping means so as to displace the workpiece to a predetermined position when the amount of difference between the position of the workpiece and the predetermind standard position of the workpiece exceeds a predetermind amount, and to position the workpiece in said predetermined standard position by varying a restraining force applied to the workpiece when the workpiece is positioned in or near the predetermined standard position.

* * * * *